US012553011B2

(12) United States Patent
Brooker et al.

(10) Patent No.: US 12,553,011 B2
(45) Date of Patent: Feb. 17, 2026

(54) SOLID FREE-FLOWING PARTICULATE LAUNDRY DETERGENT COMPOSITION

(71) Applicant: The Procter & Gamble Company, Cincinnati, OH (US)

(72) Inventors: Alan Thomas Brooker, Newcastle upon Tyne (GB); Linsey Sarah Fuller, Newcastle upon Tyne (GB); Robert William John Sterry, Newcastle upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 338 days.

(21) Appl. No.: 18/333,749

(22) Filed: Jun. 13, 2023

(65) Prior Publication Data

US 2023/0416645 A1 Dec. 28, 2023

(30) Foreign Application Priority Data

Jun. 27, 2022 (EP) .................................... 22181227

(51) Int. Cl.

| | |
|---|---|
| ***C11D 1/00*** | (2006.01) |
| ***C11D 1/14*** | (2006.01) |
| ***C11D 1/83*** | (2006.01) |
| ***C11D 3/00*** | (2006.01) |
| ***C11D 3/10*** | (2006.01) |
| ***C11D 3/16*** | (2006.01) |
| ***C11D 3/386*** | (2006.01) |
| ***C11D 3/40*** | (2006.01) |
| ***C11D 3/50*** | (2006.01) |
| ***C11D 17/06*** | (2006.01) |

(52) U.S. Cl.

CPC ............. *C11D 3/168* (2013.01); *C11D 1/143* (2013.01); *C11D 1/83* (2013.01); *C11D 3/0036* (2013.01); *C11D 3/10* (2013.01); *C11D 3/386* (2013.01); *C11D 3/40* (2013.01); *C11D 3/50* (2013.01); *C11D 17/06* (2013.01); *C11D 2111/12* (2024.01)

(58) Field of Classification Search

CPC ........... C11D 3/168; C11D 1/143; C11D 1/83; C11D 3/0036; C11D 3/10; C11D 3/386; C11D 3/40; C11D 3/50; C11D 17/06; C11D 2111/12; C11D 3/28; C11D 3/38609

USPC ........................................................ 510/311

See application file for complete search history.

(56) References Cited

U.S. PATENT DOCUMENTS

| | | | | |
|---|---|---|---|---|
| 6,818,149 | B2 | 11/2004 | Boerzel et al. | |
| 2002/0149000 | A1* | 10/2002 | Boerzel | C07D 471/08 252/188.1 |
| 2002/0198127 | A1* | 12/2002 | Adriaanse | C11D 3/168 510/392 |
| 2003/0230736 | A1 | 12/2003 | Hage et al. | |
| 2007/0173427 | A1 | 7/2007 | Hage et al. | |
| 2008/0035885 | A1 | 2/2008 | Hage | |

FOREIGN PATENT DOCUMENTS

| | | | |
|---|---|---|---|
| EP | 1379618 | B1 | 6/2006 |
| EP | 2228429 | A1 | 9/2010 |
| EP | 3088504 | A1 | 11/2016 |
| WO | 02068574 | A1 | 9/2002 |
| WO | 03104378 | A1 | 12/2003 |
| WO | 2013092051 | A1 | 6/2013 |
| WO | 2019075148 | A1 | 4/2019 |

OTHER PUBLICATIONS

STIC Search Report dated Jun. 30, 2025.*
All Office Actions; U.S. Appl. No. 18/333,763, filed Jun. 13, 2023.
PCT Search Report and Written Opinion for PCT/US2023/068849 dated Jul. 31, 2023; 14 pages.
Extended EP Search Report and Opinion for 22181227.4 dated Dec. 2, 2022, 9 pages.
U.S. Appl. No. 18/333,763, filed Jun. 13, 2023, to Alan Thomas Brooker et al.

* cited by examiner

*Primary Examiner* — Eisa B Elhilo
(74) *Attorney, Agent, or Firm* — Gary J. Foose

(57) ABSTRACT

A solid free-flowing particulate laundry detergent composition, wherein the composition including a detersive surfactant and an iron-based bleach catalyst, the composition being substantially free of a source of hydrogen peroxide, and the composition having an equilibrium pH at 20° C. at a concentration of 1 g/l in deionized water of greater than 10.0.

15 Claims, No Drawings

SOLID FREE-FLOWING PARTICULATE LAUNDRY DETERGENT COMPOSITION

FIELD OF THE INVENTION

The present invention relates to a solid free-flowing particulate laundry detergent composition. The composition of the present invention comprises a detersive surfactant and a specific iron-based bleach catalyst. The composition of the present invention provides good cleaning performance, especially good cleaning against curry stains, in the absence of any source of hydrogen peroxide bleach.

BACKGROUND OF THE INVENTION

The consumer perception of laundry detergent powders is that they deliver superior cleaning performance compared to other laundry detergent product forms, such as laundry detergent liquids and laundry detergent pouches. To this end, the cleaning performance of the laundry detergent powder needs to be very good. One way to ensure that the cleaning performance of the laundry detergent powder is very good, is to ensure that the stain removal performance of the product is very good. Tough stains to remove include curry stains. Not only does a good stain removal performance important to the overall cleaning performance, but it is also one of the predominant signals to the consumer that the product has a good cleaning performance. A detergent powder that can remove curry stains well, drives acceptance with the consumer that the overall cleaning performance of the laundry detergent powder is good.

Laundry detergent powders are typically highly alkaline, having a pH profile of ~10.5, typically being buffered to this pH profile by sodium carbonate. This level of alkalinity provides good cleaning and is one of the main reasons why laundry detergent powders have superior cleaning performance compared to product forms that typically have a lower pH profile, such as liquids and pouches.

Detergent ingredients, such as bleach catalysts, have been formulated together with the peroxygen bleach system typically used in laundry detergent powders to increase the performance of the bleach. Laundry detergent powders having a high pH profile and comprising peroxygen bleach are considered the best at providing a good cleaning performance.

However, there is also a need to provide laundry detergent powders that do no comprise peroxgen bleach. These products are designed to be used for coloured fabrics. In the supermarket, the laundry detergent powder products are usually separated into regular and colour products, the main formulation difference between a regular laundry detergent powder and a colour laundry detergent powder is the presence of a peroxygen bleach in the regular product and the absence of a peroxygen bleach in the colour product.

However, these peroxygen bleach free "colour" laundry detergent powders are still considered by the consumers to have a good cleaning performance, and they still need to be formulated in a way that meets this consumer acceptance need to signal that they have a good cleaning performance.

Therefore, there is a need to improve the cleaning performance, and especially the removal of stains such as curry stains, in laundry detergent powders that do not have a peroxygen bleach.

The inventors have found that specific iron-based bleach catalysts, known as FeONIX and FeONIX-A, provide exceptional curry stain removal performance at high pH even in the absence of a peroxygen bleach system. This enables "colour" laundry detergent powders to be formulated that have good curry stain removal and signal to the consumer that they have a good cleaning performance,

SUMMARY OF THE INVENTION

The present invention provides a solid free-flowing particulate laundry detergent composition, wherein the composition comprises:

(a) detersive surfactant; and (b) iron-based bleach catalyst having the following structure:

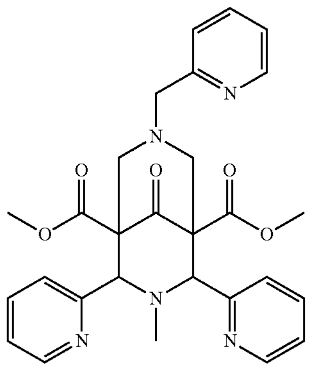

or

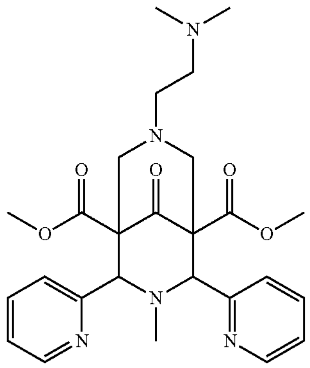

wherein the composition is substantially free of a source of hydrogen peroxide, wherein the composition has an equilibrium pH at 20° C. at a concentration of 1 g/l in deionized water of greater than 10.0.

DETAILED DESCRIPTION OF THE INVENTION

Solid free-flowing particulate laundry detergent composition. The composition is a solid free-flowing particulate laundry detergent composition. The composition comprises:

(a) detersive surfactant; and (b) iron-based bleach catalyst having the following structure:

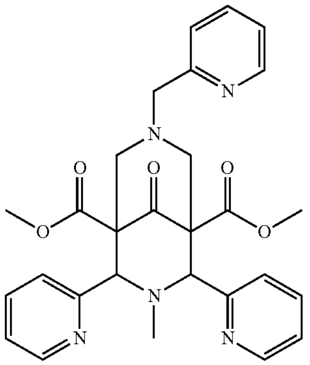

or

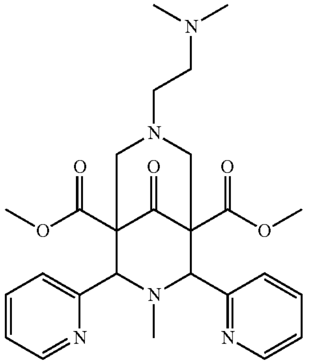

The composition is substantially free of a source of hydrogen peroxide. By "substantially free" it is typically meant that no source of hydrogen peroxide is deliberately included in the composition. However, trace levels, e.g. due to impurities and/or contamination, may be present in the composition, although preferably this is avoided. Typically, if present, the level of any source of hydrogen peroxide is less than 2.0 wt %, preferably less than 1.0 wt %, more preferably less than 0.5 wt %, or even less than 0.1 wt % of the composition.

The composition has an equilibrium pH at 20° C. at a concentration of 1 g/l in deionized water of greater than 10.0, preferably from 10.0 to 12.0, or from 10.0 to 11.5, or from 10.0 to 11.0, or preferably from 10.4 to 12.5, or from 10.4 to 12.0, or from 10.4 to 11.5, or from 10.4 to 11.

Preferably, the composition is substantially free of percarbonate bleach. By "substantially free" it is typically meant that no percarbonate bleach is deliberately included in the composition. However, trace levels, e.g. due to impurities and/or contamination, may be present in the composition, although preferably this is avoided. Typically, if present, the level of any percarbonate bleach is less than 2.0 wt %, preferably less than 1.0 wt %, more preferably less than 0.5 wt %, or even less than 0.1 wt % of the composition.

Preferably, the composition is substantially free of bleach activator. By "substantially free" it is typically meant that no bleach activator is deliberately included in the composition. However, trace levels, e.g. due to impurities and/or contamination, may be present in the composition, although preferably this is avoided. Typically, if present, the level of any bleach activator is less than 2.0 wt %, preferably less than 1.0 wt %, more preferably less than 0.5 wt %, or even less than 0.1 wt % of the composition.

Preferably, the composition is substantially free of tetraacetyl ethylenediamine (TAED). By "substantially free" it is typically meant that no TAED is deliberately included in the composition. However, trace levels, e.g. due to impurities and/or contamination, may be present in the composition, although preferably this is avoided. Typically, if present, the level of any TAED is less than 2.0 wt %, preferably less than 1.0 wt %, more preferably less than 0.5 wt %, or even less than 0.1 wt % of the composition.

Preferably, the composition comprises sodium carbonate.

Preferably, the composition comprises anionic detersive surfactant. Suitable anionic detersive surfactants are described in more detail below. Preferably, the composition comprises anionic detersive surfactant selected from alkyl sulphate and/or alkyl benzene sulphonate. A preferred alkyl sulphate is a $C_8$-$C_{24}$ alkyl sulphate, especially preferred is a mid-cut alkyl sulphate (MCAS), such as a $C_{12}$-$C_{14}$ alkyl sulphate. A preferred alkyl benzene sulphonate is a $C_1$-$C_{13}$ alkyl benzene sulphonate, an especially preferred alkyl benzene sulphonate is a linear $C_{11}$-$C_{13}$ alkyl benzene sulphonate.

Preferably, the composition comprises a dye transfer inhibitor. Suitable dye transfer inhibitors are described in more detail below.

Preferably, the composition comprises non-ionic detersive surfactant. Suitable non-ionic detersive surfactants are described in more detail below.

Preferably, the composition comprises hueing dye.

Preferably, the composition comprises chelant. Suitable chelants are described in more detail below.

Preferably, the composition comprises enzyme. Suitable enzymes are described in more detail below.

Preferably, the composition comprises perfume. Suitable perfumes are described in more detail below.

Preferably, the composition comprises soil release polymer. Suitable soil release polymers are described in more detail below.

Preferably, the composition comprises:

(a) from 8 wt % to 60 wt % detersive surfactant; and (b) from 0.001 wt % to 1.0 wt % iron-based bleach catalyst.

Preferred ranges of other suitable ingredients are provided below:

(c) from 1.0 wt % to 40 wt % sodium carbonate.

(d) from 0.1 wt % to 5.0 wt % dye transfer inhibitor.

(e) from 0.5 wt % to 10 wt % non-ionic detersive surfactant.

(f) from 0 wt % to 5.0 wt %, or from above 0 wt % to 2.0 wt % hueing dye.

(g) from 0.2 wt % to 5.0 wt % chelant.

(h) from 0.1 wt % to 5.0 wt % enzyme.

(i) from 0.1 wt % to 5.0 wt % perfume.

(j) from 0.1 wt % to 10 wt % soil release polymer.

Typically, the solid free-flowing particulate laundry detergent composition is a fully formulated laundry detergent composition, not a portion thereof such as a spray-dried, extruded or agglomerate particle that only forms part of the laundry detergent composition. Typically, the solid composition comprises a plurality of chemically different particles, such as spray-dried base detergent particles and/or agglomerated base detergent particles and/or extruded base detergent particles, in combination with one or more, typically two or more, or five or more, or even ten or more particles selected from: surfactant particles, including surfactant agglomerates, surfactant extrudates, surfactant needles, surfactant noodles, surfactant flakes; phosphate particles; zeolite particles; silicate salt particles, especially sodium silicate particles; carbonate salt particles, especially sodium carbonate particles; polymer particles such as carboxylate polymer particles, cellulosic polymer particles, starch particles, poly-ester particles, polyamine particles, terephthalate polymer particles, polyethylene glycol particles; aesthetic particles such as coloured noodles, needles, lamellae particles and ring particles; enzyme particles such as protease granulates, amylase granulates, lipase granulates, cellulase granulates, mannanase granulates, pectate lyase granulates, xyloglucanase granulates, bleaching enzyme granulates and co-granulates of any of these enzymes, preferably these enzyme granulates comprise sodium sulphate; bleach particles, such as percarbonate particles, especially coated percarbonate particles, such as percarbonate coated with carbonate salt, sulphate salt, silicate salt, borosilicate salt, or any combination thereof, perborate particles, bleach activator particles such as tetra acetyl ethylene diamine particles and/or alkyl oxybenzene sulphonate particles, bleach catalyst particles such as transition metal catalyst particles, and/or isoquinolinium bleach catalyst particles, pre-formed peracid particles, especially coated pre-formed peracid particles; filler particles such as sulphate salt particles and chloride particles; clay particles such as montmorillonite particles and particles of clay and silicone; flocculant particles such as polyethylene oxide particles; wax particles such as wax agglomerates; silicone particles, brightener particles; dye transfer inhibition particles; dye fixative particles; perfume particles such as perfume microcapsules and starch encapsulated perfume accord particles, or pro-perfume particles such as Schiff base reaction product particles; hueing dye particles; chelant particles such as chelant agglomerates; and any combination thereof.

Suitable compositions typically comprise a detergent ingredient selected from: detersive surfactant, such as anionic detersive surfactants, non-ionic detersive surfactants, cationic detersive surfactants, zwitterionic detersive surfactants and amphoteric detersive surfactants; polymers, such as carboxylate polymers, soil release polymer, anti-redeposition polymers, cellulosic polymers and care polymers; bleach, such as sources of hydrogen peroxide, bleach activators, bleach catalysts and pre-formed peracids; photobleach, such as such as zinc and/or aluminium sulphonated phthalocyanine; enzymes, such as proteases, amylases, cellulases, lipases; zeolite builder; phosphate builder; co-builders, such as citric acid and citrate; carbonate, such as sodium carbonate and sodium bicarbonate; sulphate salt, such as sodium sulphate; silicate salt such as sodium silicate; chloride salt, such as sodium chloride; brighteners; chelants; hueing agents; dye transfer inhibitors; dye fixative agents; perfume; silicone; fabric softening agents, such as clay; flocculants, such as polyethyleneoxide; suds supressors; and any combination thereof.

Suitable compositions may have a low buffering capacity. Such laundry detergent compositions typically have a reserve alkalinity to pH 9.5 of less than 5.0 gNaOH/100 g. These low buffered laundry detergent compositions typically comprise low levels of carbonate salt.

Iron-based bleach catalyst. The iron-based bleach catalyst has the following structure:

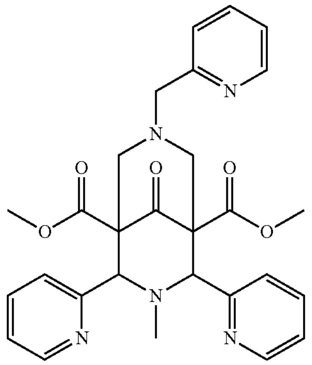

or

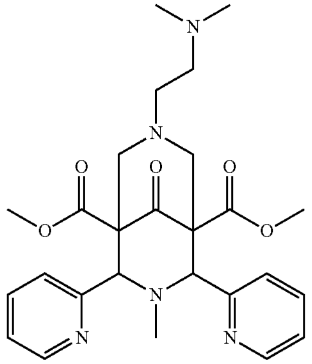

Suitable iron-based bleach catalysts include WeylClean® FeONIX from Weylchem and/or WeylClean® FeONIX-A from Weylchem.

Detersive Surfactant: Suitable detersive surfactants include anionic detersive surfactants, non-ionic detersive surfactant, cationic detersive surfactants, zwitterionic detersive surfactants and amphoteric detersive surfactants. Suitable detersive surfactants may be linear or branched, substituted or un-substituted, and may be derived from petrochemical material or biomaterial.

Anionic detersive surfactant: Suitable anionic detersive surfactants include sulphonate and sulphate detersive surfactants.

Suitable sulphonate detersive surfactants include methyl ester sulphonates, alpha olefin sulphonates, alkyl benzene sulphonates, especially alkyl benzene sulphonates, preferably $C_{10-13}$ alkyl benzene sulphonate. Suitable alkyl benzene sulphonate (LAS) is obtainable, preferably obtained, by sulphonating commercially available linear alkyl benzene (LAB); suitable LAB includes low 2-phenyl LAB, other suitable LAB include high 2-phenyl LAB, such as those supplied by Sasol under the tradename Hyblene®.

Suitable sulphate detersive surfactants include alkyl sulphate, preferably $C_{8-18}$ alkyl sulphate, or predominantly $C_{12}$ alkyl sulphate.

A preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 5, more preferably from 0.5 to 3 and most preferably from 0.5 to 1.5.

The alkyl sulphate, alkyl alkoxylated sulphate and alkyl benzene sulphonates may be linear or branched, substituted or un-substituted, and may be derived from petrochemical material or biomaterial.

Other suitable anionic detersive surfactants include alkyl ether carboxylates.

Suitable anionic detersive surfactants may be in salt form, suitable counter-ions include sodium, calcium, magnesium, amino alcohols, and any combination thereof. A preferred counter-ion is sodium.

Non-ionic detersive surfactant: Suitable non-ionic detersive surfactants are selected from the group consisting of: $C_8$-$C_{18}$ alkyl ethoxylates, such as, NEODOL® non-ionic surfactants from Shell; $C_6$-$C_{12}$ alkyl phenol alkoxylates wherein preferably the alkoxylate units are ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic® from BASF; alkylpolysaccharides, preferably alkylpolyglycosides; methyl ester ethoxylates; polyhydroxy fatty acid amides; ether capped poly(oxyalkylated) alcohol surfactants; and mixtures thereof.

Suitable non-ionic detersive surfactants are alkylpolyglucoside and/or an alkyl alkoxylated alcohol.

Suitable non-ionic detersive surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched, and substituted or un-substituted.

Suitable nonionic detersive surfactants include secondary alcohol-based detersive surfactants.

Cationic detersive surfactant: Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate.

Zwitterionic detersive surfactant: Suitable zwitterionic detersive surfactants include amine oxides and/or betaines.

Polymer: Suitable polymers include carboxylate polymers, soil release polymers, anti-redeposition polymers, cellulosic polymers, care polymers and any combination thereof.

Carboxylate polymer: The composition may comprise a carboxylate polymer, such as a maleate/acrylate random copolymer or polyacrylate homopolymer. Suitable carboxylate polymers include: polyacrylate homopolymers having a molecular weight of from 4,000 Da to 9,000 Da; maleate/acrylate random copolymers having a molecular weight of from 50,000 Da to 100,000 Da, or from 60,000 Da to 80,000 Da.

Another suitable carboxylate polymer is a co-polymer that comprises: (i) from 50 to less than 98 wt % structural units derived from one or more monomers comprising carboxyl groups; (ii) from 1 to less than 49 wt % structural units derived from one or more monomers comprising sulfonate moieties; and (iii) from 1 to 49 wt % structural units derived from one or more types of monomers selected from ether bond-containing monomers represented by formulas (I) and (II):

formula (I)

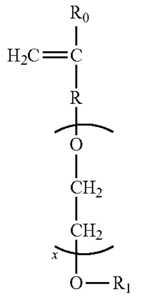

wherein in formula (I), $R_0$ represents a hydrogen atom or $CH_3$ group, R represents a $CH_2$ group, $CH_2CH_2$ group or single bond, X represents a number 0-5 provided X represents a number 1-5 when R is a single bond, and $R_1$ is a hydrogen atom or $C_1$ to $C_{20}$ organic group; formula (II)

formula (II)

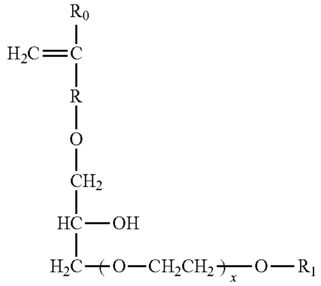

wherein in formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

It may be preferred that the polymer has a weight average molecular weight of at least 50 kDa, or even at least 70 kDa.

Soil release polymer: The composition may comprise a soil release polymer. A suitable soil release polymer has a structure as defined by one of the following structures (I), (II) or (III):

$$—[(OCHR^1—CHR^2)_a—O—OC—Ar—CO—]_d \quad (I)$$

$$—[(OCHR^3—CHR^4)_b—O—OC\text{-}sAr—CO—]_e \quad (II)$$

$$—[(OCHR^5—CHR^6)_c—OR^7]_f \quad (III)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$; Me is Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable soil release polymers are sold by Clariant under the TexCare® series of polymers, e.g. TexCare® SRN240 and TexCare® SRA300. Other suitable soil release polymers are sold by Solvay under the Repel-o-Tex® series of polymers, e.g. Repel-o-Tex® SF2 and Repel-o-Tex® Crystal.

Anti-redeposition polymer: Suitable anti-redeposition polymers include polyethylene glycol polymers and/or polyethyleneimine polymers.

Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide unit can be less than 0.02, or less than 0.016, the average number of graft sites per ethylene oxide unit can be in the range of from 0.010 to 0.018, or the average number of graft sites per ethylene oxide unit can be less than 0.010, or in the range of from 0.004 to 0.008.

Suitable polyethylene glycol polymers are described in WO08/007320.

A suitable polyethylene glycol polymer is Sokalan HP22.

Cellulosic polymer: Suitable cellulosic polymers are selected from alkyl cellulose, alkyl alkoxyalkyl cellulose, carboxyalkyl cellulose, alkyl carboxyalkyl cellulose, sulphoalkyl cellulose, more preferably selected from carboxymethyl cellulose, methyl cellulose, methyl hydroxyethyl cellulose, methyl carboxymethyl cellulose, and mixtures thereof.

Suitable carboxymethyl celluloses have a degree of carboxymethyl substitution from 0.5 to 0.9 and a molecular weight from 100,000 Da to 300,000 Da.

Suitable carboxymethyl celluloses have a degree of substitution greater than 0.65 and a degree of blockiness greater than 0.45, e.g. as described in WO09/154933.

Care polymers: Suitable care polymers include cellulosic polymers that are cationically modified or hydrophobically modified. Such modified cellulosic polymers can provide anti-abrasion benefits and dye lock benefits to fabric during the laundering cycle. Suitable cellulosic polymers include cationically modified hydroxyethyl cellulose.

Other suitable care polymers include dye lock polymers, for example the condensation oligomer produced by the condensation of imidazole and epichlorhydrin, preferably in ratio of 1:4:1. A suitable commercially available dye lock polymer is Polyquart® FDI (Cognis).

Other suitable care polymers include amino-silicone, which can provide fabric feel benefits and fabric shape retention benefits.

Enzymes: Suitable enzymes include lipases, proteases, cellulases, amylases and any combination thereof.

Protease: Suitable proteases include metalloproteases and/or serine proteases. Examples of suitable neutral or alkaline proteases include: subtilisins (EC 3.4.21.62); trypsin-type or chymotrypsin-type proteases; and metalloproteases. The suitable proteases include chemically or genetically modified mutants of the aforementioned suitable proteases.

Suitable commercially available protease enzymes include those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark), those sold under the tradename Maxatase®, Maxacal®, Maxapem®, Preferenz P® series of proteases including Preferenz® P280, Preferenz® P281, Preferenz® P2018-C, Preferenz® P2081-WE, Preferenz® P2082-EE and Preferenz® P2083-A/J, Properase®, Purafect®, Purafect Prime®, Purafect Ox®, FN3®, FN4®, Excellase® and Purafect OXP® by DuPont, those sold under the tradename Opticlean® and Optimase® by Solvay Enzymes, those available from Henkel/Kemira, namely BLAP (sequence shown in FIG. 29 of U.S. Pat. No. 5,352,604 with the following mutations S99D+S101 R+S103A+V104I+G159S, hereinafter referred to as BLAP), BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D)—all from Henkel/Kemira; and KAP (*Bacillus alkalophilus* subtilisin with mutations A230V+S256G+S259N) from Kao.

A suitable protease is described in WO11/140316 and WO11/072117.

Amylase: Suitable amylases are derived from AA560 alpha amylase endogenous to *Bacillus* sp. DSM 12649, preferably having the following mutations: R118K, D183*, G184*, N195F, R320K, and/or R458K. Suitable commercially available amylases include Stainzyme®, Stainzyme® Plus, Natalase, Termamyl®, Termamyl® Ultra, Liquezyme® SZ, Duramyl®, Everest® (all Novozymes) and Spezyme® AA, Preferenz S® series of amylases, Purastar® and Purastar® Ox Am, Optisize® HT Plus (all Du Pont).

A suitable amylase is described in WO06/002643.

Cellulase: Suitable cellulases include those of bacterial or fungal origin. Chemically modified or protein engineered mutants are also suitable. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*.

Commercially available cellulases include Celluzyme®, Carezyme®, and Carezyme® Premium, Celluclean® and Whitezyme® (Novozymes A/S), Revitalenz® series of enzymes (Du Pont), and Biotouch® series of enzymes (AB Enzymes). Suitable commercially available cellulases include Carezyme® Premium, Celluclean® Classic. Suitable cellulases are described in WO07/144857 and WO10/056652.

Lipase: Suitable lipases include those of bacterial, fungal or synthetic origin, and variants thereof. Chemically modified or protein engineered mutants are also suitable. Examples of suitable lipases include lipases from *Humicola* (synonym *Thermomyces*), e.g., from *H. lanuginosa* (*T. lanuginosus*).

The lipase may be a "first cycle lipase", e.g. such as those described in WO06/090335 and WO13/116261. In one aspect, the lipase is a first-wash lipase, preferably a variant of the wild-type lipase from *Thermomyces lanuginosus* comprising T231R and/or N233R mutations. Preferred lipases include those sold under the tradenames Lipex®, Lipolex® and Lipoclean® by Novozymes, Bagsvaerd, Denmark.

Other suitable lipases include: Liprl 139, e.g. as described in WO2013/171241; and TfuLip2, e.g. as described in WO2011/084412 and WO2013/033318.

Other enzymes: Other suitable enzymes are bleaching enzymes, such as peroxidases/oxidases, which include those of plant, bacterial or fungal origin and variants thereof. Commercially available peroxidases include Guardzyme® (Novozymes A/S). Other suitable enzymes include choline oxidases and perhydrolases such as those used in Gentle Power Bleach™.

Other suitable enzymes include pectate lyases sold under the tradenames X-Pect®, Pectaway® (from Novozymes A/S, Bagsvaerd, Denmark) and PrimaGreen® (DuPont) and mannanases sold under the tradenames Mannaway® (Novozymes A/S, Bagsvaerd, Denmark), and Mannastar® (Du Pont).

Zeolite builder: The composition may comprise zeolite builder. The composition may comprise from 0 wt % to 5 wt % zeolite builder, or 3 wt % zeolite builder. The composition may even be substantially free of zeolite builder; substantially free means "no deliberately added". Typical zeolite builders include zeolite A, zeolite P and zeolite MAP.

Phosphate builder: The composition may comprise phosphate builder. The composition may comprise from 0 wt % to 5 wt % phosphate builder, or to 3 wt %, phosphate builder. The composition may even be substantially free of phosphate builder; substantially free means "no deliberately added". A typical phosphate builder is sodium tri-polyphosphate.

Carbonate salt: The composition may comprise carbonate salt. The composition may comprise from 0 wt % to 10 wt % carbonate salt, or to 5 wt % carbonate salt. The composition may even be substantially free of carbonate salt; substantially free means "no deliberately added".

Suitable carbonate salts include sodium carbonate and sodium bicarbonate.

Silicate salt: The composition may comprise silicate salt. The composition may comprise from 0 wt % to 10 wt % silicate salt, or to 5 wt % silicate salt. A preferred silicate salt is sodium silicate, especially preferred are sodium silicates having a $Na_2O:SiO_2$ ratio of from 1.0 to 2.8, preferably from 1.6 to 2.0.

Sulphate salt: A suitable sulphate salt is sodium sulphate.

Brightener: Suitable fluorescent brighteners include: distyryl biphenyl compounds, e.g. Tinopal® CBS-X, di-amino stilbene di-sulfonic acid compounds, e.g. Tinopal® DMS pure Xtra and Blankophor® HRH, and Pyrazoline compounds, e.g. Blankophor® SN, and coumarin compounds, e.g. Tinopal® SWN.

Preferred brighteners are: sodium 2 (4-styryl-3-sulfophenyl)-2H-napthol[1,2-d]triazole, disodium 4,4'-bis{[(4-anilino-6-(N methyl-N-2 hydroxyethyl)amino 1,3,5-triazin-2-yl)];amino}stilbene-2-2' disulfonate, disodium 4,4'-bis{[(4-anilino-6-morpholino-1,3,5-triazin-2-yl)]amino}stilbene-2-2' disulfonate, and disodium 4,4'-bis(2-sulfostyryl)biphenyl. A suitable fluorescent brightener is C.I. Fluorescent Brightener 260, which may be used in its beta or alpha crystalline forms, or a mixture of these forms.

Chelant: The composition may also comprise a chelant. Suitable chelating agents may include phosphonates, aminocarboxylates, amino phosphonates, polyfunctionally-substituted aromatic chelating agents, or mixtures thereof, preferably aminocarboxylates. The chelating agents, as used herein, are not intended to include traditional builders, such as citric acid, although such builders may be present in compositions of the present disclosure.

Aminocarboxylates useful as chelating agents include, but are not limited to, ethylenediaminetetracetates, N-(hydroxyethyl)ethylenediaminetriacetates, nitrilotriacetates, ethylenediamine tetraproprionates, triethylenetetraaminehexacetates, diethylenetriamine-pentaacetates, and ethanoldiglycines, alkali metal, ammonium, and substituted ammonium salts thereof, and mixtures thereof. Aminophosphonates are also suitable for use as chelating agents in the compositions of the invention when low levels of total phosphorus are permitted; and include ethylenediaminetetrakis (methylenephosphonates). Polyfunctionally-substituted aromatic chelating agents may include catechols, for example sulphonated catechols.

Suitable chelating agents may include: DTPA (diethylenetriaminepentaacetic acid), HEDP (hydroxyethanediphosphonic acid), EDDS (ethylenediamine disuccinate (EDDS), DTPMP (diethylene triamine penta (methylene phosphonic acid)), EDTMP (ethylene diamine tetra(methylene phosphonic acid)), Tiron® (1,2-diydroxybenzene-3,5-disulfonic acid), HPNO (2-pyridinol-N-oxide), MGDA (methylglycinediacetic acid), GLDA (glutamic-N,N-diacetic acid), any suitable derivative thereof, salts thereof, and mixtures thereof.

Hueing agent: Suitable hueing agents include small molecule dyes, typically falling into the Colour Index (C.I.) classifications of Acid, Direct, Basic, Reactive (including hydrolysed forms thereof) or Solvent or Disperse dyes, for example classified as Blue, Violet, Red, Green or Black, and provide the desired shade either alone or in combination. Preferred such hueing agents include Acid Violet 50, Direct Violet 9, 66 and 99, Solvent Violet 13 and any combination thereof.

Many hueing agents are known and described in the art which may be suitable for the present invention, such as hueing agents described in WO2014/089386.

Suitable hueing agents include phthalocyanine and azo dye conjugates, such as described in WO2009/069077.

Suitable hueing agents may be alkoxylated. Such alkoxylated compounds may be produced by organic synthesis that may produce a mixture of molecules having different degrees of alkoxylation. Such mixtures may be used directly to provide the hueing agent, or may undergo a purification step to increase the proportion of the target molecule. Suitable hueing agents include alkoxylated bis-azo dyes, such as described in WO2012/054835, and/or alkoxylated thiophene azo dyes, such as described in WO2008/087497 and WO2012/166768.

The hueing agent may be incorporated into the detergent composition as part of a reaction mixture which is the result of the organic synthesis for a dye molecule, with optional purification step(s). Such reaction mixtures generally comprise the dye molecule itself and in addition may comprise un-reacted starting materials and/or by-products of the organic synthesis route. Suitable hueing agents can be incorporated into hueing dye particles, such as described in WO 2009/069077.

Dye transfer inhibitors: Suitable dye transfer inhibitors include polyamine N-oxide polymers, copolymers of N-vinylpyrrolidone and N-vinylimidazole, polyvinylpyrrolidone, polyvinyloxazolidone, polyvinylimidazole and mixtures thereof. Preferred are poly(vinyl pyrrolidone), poly (vinylpyridine betaine), poly(vinylpyridine N-oxide), poly (vinyl pyrrolidone-vinyl imidazole) and mixtures thereof. Suitable commercially available dye transfer inhibitors include PVP-K15 and K30 (Ashland), Sokalan® HP165, HP50, HP53, HP59, HP56K, HP56, HP66 (BASF), Chromabond® S-400, S403E and S-100 (Ashland).

Perfume: Suitable perfumes comprise perfume materials selected from the group: (a) perfume materials having a C log P of less than 3.0 and a boiling point of less than 250° C. (quadrant 1 perfume materials); (b) perfume materials having a C log P of less than 3.0 and a boiling point of 250° C. or greater (quadrant 2 perfume materials); (c) perfume materials having a C log P of 3.0 or greater and a boiling point of less than 250° C. (quadrant 3 perfume materials); (d) perfume materials having a C log P of 3.0 or greater and a boiling point of 250° C. or greater (quadrant 4 perfume materials); and (e) mixtures thereof.

It may be preferred for the perfume to be in the form of a perfume delivery technology. Such delivery technologies further stabilize and enhance the deposition and release of perfume materials from the laundered fabric. Such perfume delivery technologies can also be used to further increase the longevity of perfume release from the laundered fabric. Suitable perfume delivery technologies include: perfume microcapsules, pro-perfumes, polymer assisted deliveries, molecule assisted deliveries, fiber assisted deliveries, amine assisted deliveries, cyclodextrin, starch encapsulated accord, zeolite and other inorganic carriers, and any mixture thereof. A suitable perfume microcapsule is described in WO2009/101593.

Silicone: Suitable silicones include polydimethylsiloxane and amino-silicones. Suitable silicones are described in WO05075616.

Process for making the composition: Typically, the particles of the composition can be prepared by any suitable method. For example: spray-drying, agglomeration, extrusion and any combination thereof.

Typically, a suitable spray-drying process comprises the step of forming an aqueous slurry mixture, transferring it through at least one pump, preferably two pumps, to a pressure nozzle. Atomizing the aqueous slurry mixture into a spray-drying tower and drying the aqueous slurry mixture to form spray-dried particles. Preferably, the spray-drying tower is a counter-current spray-drying tower, although a co-current spray-drying tower may also be suitable.

Typically, the spray-dried powder is subjected to cooling, for example an air lift. Typically, the spray-drying powder is subjected to particle size classification, for example a sieve, to obtain the desired particle size distribution. Preferably, the spray-dried powder has a particle size distribution such that weight average particle size is in the range of from 300 micrometers to 500 micrometers, and less than 10 wt % of the spray-dried particles have a particle size greater than 2360 micrometers.

It may be preferred to heat the aqueous slurry mixture to elevated temperatures prior to atomization into the spray-drying tower, such as described in WO2009/158162.

It may be preferred for anionic surfactant, such as linear alkyl benzene sulphonate, to be introduced into the spray-drying process after the step of forming the aqueous slurry mixture: for example, introducing an acid precursor to the aqueous slurry mixture after the pump, such as described in WO 09/158449.

It may be preferred for a gas, such as air, to be introduced into the spray-drying process after the step of forming the aqueous slurry, such as described in WO2013/181205.

It may be preferred for any inorganic ingredients, such as sodium sulphate and sodium carbonate, if present in the aqueous slurry mixture, to be micronized to a small particle size such as described in WO2012/134969.

Typically, a suitable agglomeration process comprises the step of contacting a detersive ingredient, such as a detersive surfactant, e.g. linear alkyl benzene sulphonate (LAS) and/or alkyl alkoxylated sulphate, with an inorganic material, such as sodium carbonate and/or silica, in a mixer. The agglomeration process may also be an in-situ neutralization agglomeration process wherein an acid precursor of a detersive surfactant, such as LAS, is contacted with an alkaline material, such as carbonate and/or sodium hydroxide, in a mixer, and wherein the acid precursor of a detersive surfactant is neutralized by the alkaline material to form a detersive surfactant during the agglomeration process.

Other suitable detergent ingredients that may be agglomerated include polymers, chelants, bleach activators, silicones and any combination thereof.

The agglomeration process may be a high, medium or low shear agglomeration process, wherein a high shear, medium shear or low shear mixer is used accordingly. The agglomeration process may be a multi-step agglomeration process wherein two or more mixers are used, such as a high shear mixer in combination with a medium or low shear mixer. The agglomeration process can be a continuous process or a batch process.

It may be preferred for the agglomerates to be subjected to a drying step, for example to a fluid bed drying step. It may also be preferred for the agglomerates to be subjected to a cooling step, for example a fluid bed cooling step.

Typically, the agglomerates are subjected to particle size classification, for example a fluid bed elutriation and/or a sieve, to obtain the desired particle size distribution. Preferably, the agglomerates have a particle size distribution such that weight average particle size is in the range of from 300 micrometers to 800 micrometers, and less than 10 wt % of the agglomerates have a particle size less than 150 micrometers and less than 10 wt % of the agglomerates have a particle size greater than 1200 micrometers.

It may be preferred for fines and over-sized agglomerates to be recycled back into the agglomeration process. Typically, over-sized particles are subjected to a size reduction step, such as grinding, and recycled back into an appropriate place in the agglomeration process, such as the mixer. Typically, fines are recycled back into an appropriate place in the agglomeration process, such as the mixer.

It may be preferred for ingredients such as polymer and/or non-ionic detersive surfactant and/or perfume to be sprayed onto base detergent particles, such as spray-dried base detergent particles and/or agglomerated base detergent particles. Typically, this spray-on step is carried out in a tumbling drum mixer.

Method of laundering fabric: The method of laundering fabric comprises the step of contacting the composition to water to form a wash liquor, and laundering fabric in said wash liquor. Typically, the wash liquor has a temperature of above 0° C. to 90° C., or to 60° C., or to 40° C., or to 30° C., or to 20° C. The fabric may be contacted to the water prior to, or after, or simultaneous with, contacting the solid composition with water. Typically, the wash liquor is formed by contacting the laundry detergent to water in such an amount so that the concentration of laundry detergent composition in the wash liquor is from 0.2 g/l to 20 g/l, or from 0.5 g/l to 10 g/l, or to 5.0 g/l.

The method of laundering fabric can be carried out in a front-loading automatic washing machine, top loading automatic washing machines, including high efficiency automatic washing machines, or suitable hand-wash vessels. Typically, the wash liquor comprises 90 litres or less, or 60 litres or less, or 15 litres or less, or 10 litres or less of water.

Typically, 200 g or less, or 150 g or less, or 100 g or less, or 50 g or less of laundry detergent composition is contacted to water to form the wash liquor.

Method of Measuring pH

Typically, the pH of the composition is measured using an electrode. The composition is diluted to a concentration of 10 g/l in deionized water at 20° C. and stirred to dissolve the composition. A pH meter, such as an electrode, is then used to measure the pH of the sample.

EMBODIMENTS OF THE PRESENT INVENTION

1. A solid free-flowing particulate laundry detergent composition, wherein the composition comprises:
   (a) detersive surfactant; and
   (b) iron-based bleach catalyst having the following structure:

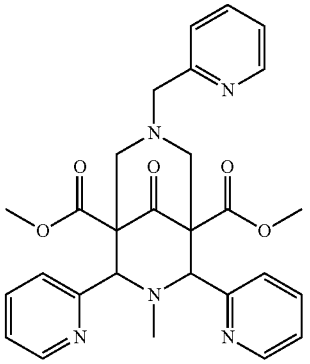

or

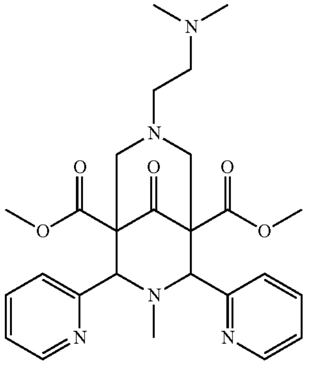

wherein the composition is substantially free of a source of hydrogen peroxide,
   wherein the composition has an equilibrium pH at 20° C. at a concentration of 1 g/l in deionized water of greater than 10.0.
2. A composition according to embodiment 1, wherein the composition is substantially free of percarbonate bleach.
3. A composition according to any preceding embodiment, wherein the composition is substantially free of bleach activator.
4. A composition according to any preceding embodiment, wherein the composition is substantially free of tetraacetyl ethylenediamine (TAED).
5. A composition according to any preceding embodiment, wherein the composition comprises sodium carbonate.
6. A composition according to any preceding embodiment, wherein the composition has an equilibrium pH at 20° C. at a concentration of 1 g/l in deionized water of from greater than 10.4 to 12.5.
7. A composition according to any preceding embodiment, wherein the composition comprises anionic detersive surfactant.
8. A composition according to any preceding embodiment, wherein the composition comprises anionic detersive surfactant selected from alkyl sulphate and/or alkyl benzene sulphonate.
9. A composition according to any preceding embodiment, wherein the composition comprises a dye transfer inhibitor.
10. A composition according to any preceding embodiment, wherein the composition comprises non-ionic detersive surfactant.
11. A composition according to any preceding embodiment, wherein the composition comprises hueing dye.
12. A composition according to any preceding embodiment, wherein the composition comprises chelant.
13. A composition according to any preceding embodiment, wherein the composition comprises enzyme.
14. A composition according to any preceding embodiment, wherein the composition comprises perfume.
15. A composition according to any preceding embodiment, wherein the composition comprises soil release polymer.

EXAMPLES

The following compositions were prepared and tested for stain removal performance.

| | Composition | | |
|---|---|---|---|
| | Comparative Composition 1 | Inventive Composition 1 | Inventive Composition 2 |
| Ingredients | Dosage (Active ppm) | | |
| Disodium 4,4'-bis[(4-anilino-6-morpholino-1,3,5-triazin-2-yl)amino]stilbene-2,2'-disulphonate | 6.69 | 6.69 | 6.69 |
| Disodium 4,4'-Bis-(2-Sulfostyryl)Biphenyl | 1.34 | 1.34 | 1.34 |
| Carboxymethyl Cellulose | 4.23 | 4.23 | 4.23 |
| Citric Acid | 0.20 | 0.20 | 0.20 |
| Mannanase | 0.01 | 0.01 | 0.01 |
| Amylase | 0.02 | 0.02 | 0.02 |
| Protease | 0.15 | 0.15 | 0.15 |
| LAS | 468.69 | 468.69 | 468.69 |
| Hueing Dye | 0.91 | 0.91 | 0.91 |
| Sodium Carbonate | 660.52 | 660.52 | 660.52 |
| Sodium Sulfate | 229.99 | 229.99 | 229.99 |
| Sodium Chloride | 2171.15 | 2171.15 | 2171.15 |
| Lipase | 0.04 | 0.04 | 0.04 |
| Sodium silicate ($SiO_2/Na_2O$ ratio 1.6-2.6) | 64.00 | 64.00 | 64.00 |
| Sulfuric acid mono-C12-14-alkyl esters sodium salts | 127.57 | 127.57 | 127.57 |
| Weylclean FeONIX | | 1.00 | |
| Weylclean FeONIX Amine | | | 1.00 |
| Zeolite | 82.43 | 82.43 | 82.43 |
| Water | 51.13 | 51.13 | 51.13 |
| Processing Aids, Minors & Perfume | 130.94 | 130.94 | 130.94 |
| Total dosage (ppm) | 4000.00 | 4001.00 | 4001.00 |

Washing method: The following method demonstrates the ability of the example compositions to remove stains during the wash process. The compositions were added separately into pots of a tergotometer. The volume of each pot was 1 L. The wash temperature was set to 27 C. Throughout the procedure, 21 gpg water was used. The wash solutions were agitated for 1 minute (300 rpm) before addition of fabrics (two internal replicates of each stain, and additional knitted cotton ballast to make the total fabric weight up to 60 g). Once the fabrics were added, the wash solution was agitated for 17 minutes (208 rpm). The wash solutions were then drained and the fabrics were subject to a 5 minute rinse step before being drained and spun dry. This procedure was repeated a further three times to give a total of four external replicates. The washed fabrics were then dried overnight at 32° C. and 80% RH conditions before being analysed to measure the stain removal from the fabric.

Stain Removal Analysis: The fabrics were analysed using commercially available DigiEye software for L*a*b* values. SRI values were then calculated from the L*a*b* values using the formula shown. The higher the SRI, the better the stain removal.

$$\% \, SRI \text{ (stain removal)}=100*((\Delta E_b-\Delta E_a)/\Delta E_b)$$

$$\Delta E_b=\surd((L_c-L_b)^2+(a_c-a_b)^2+b_c-b_b)^2)$$

$$\Delta E_a=((L_c-L_a)^2+(a_c-a_a)^2+b_c-b_a)^2)$$

Subscript 'b' denotes data for the stain before washing

Subscript 'a' denotes data for the stain after washing

Subscript 'c' denotes data for the unstained fabric

Thus, L*a*b* values are taken of the unstained fabric, of the stained fabric before washing and of the stained fabric after washing.

| Dopiaza | Average SRI | Standard Error | Delta vs. Nil Catalyst |
|---|---|---|---|
| Comparative Example (nil catalyst) | 66.89 | 2.76 | |
| Inventive Example 1 (with FeONIX) | 85.22 | 1.37 | 18.33 |
| Inventive Example 2 (with FeONIX-A) | 79.25 | 3.91 | 12.36 |

| Jalfrezi | Average SRI | Standard Error | Delta vs. Nil Catalyst |
|---|---|---|---|
| Comparative Example (nil catalyst) | 69.25 | 0.92 | |
| Inventive Example 1 (with FeONIX) | 89.21 | 0.95 | 19.96 |
| Inventive Example 2 (with FeONIX-A) | 87.04 | 1.00 | 17.79 |

| Turmeric in Chilli Oil | Average SRI | Standard Error | Delta vs. Nil Catalyst |
|---|---|---|---|
| Comparative Example (nil catalyst) | 69.25 | 3.34 | |
| Inventive Example 1 (with FeONIX) | 79.99 | 3.11 | 10.73 |
| Inventive Example 2 (with FeONIX-A) | 75.80 | 4.92 | 6.54 |

The examples demonstrate the efficacy of the iron-based catalysts within a laundry detergent powder composition which is free from oxygen-based bleach.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A solid free-flowing particulate laundry detergent composition, wherein the composition comprises:

(a) detersive surfactant; and (b) iron-based bleach catalyst having the following structure:

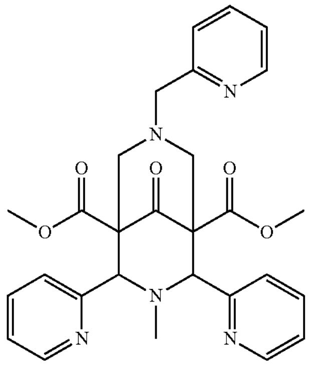 [SMILES: COC(=O)C12CN(Cc3ccccn3)CC(C(=O)OC)(C1=O)C(c1ccccn1)N(C)C2c1ccccn1]

wherein the composition is substantially free of a source of hydrogen peroxide, wherein the composition has an equilibrium pH at about 20° C. at a concentration of about 1 g/l in deionized water of greater than about 10.0.

2. The composition according to claim 1, wherein the composition is substantially free of percarbonate bleach.

3. The composition according to claim 1, wherein the composition is substantially free of bleach activator.

4. The composition according to claim 1, wherein the composition is substantially free of tetraacetyl ethylenediamine.

5. The composition according to claim 1, wherein the composition comprises sodium carbonate.

6. The composition according to claim 1, wherein the composition has an equilibrium pH at about 20° C. at a concentration of about 1 g/l in deionized water of from greater than about 10.4 to about 12.5.

7. The composition according to claim 1, wherein the composition comprises anionic detersive surfactant.

8. The composition according to claim 1, wherein the composition comprises anionic detersive surfactant selected from alkyl sulphate and/or alkyl benzene sulphonate.

9. The composition according to claim 1, wherein the composition comprises a dye transfer inhibitor.

10. The composition according to claim 1, wherein the composition comprises non-ionic detersive surfactant.

11. The composition according claim 1, wherein the composition comprises hueing dye.

12. The composition according to claim 1, wherein the composition comprises chelant.

13. The composition according to claim 1, wherein the composition comprises enzyme.

14. The composition according to claim 1, wherein the composition comprises perfume.

15. The composition according to claim 1, wherein the composition comprises soil release polymer.

* * * * *